United States Patent Office 3,231,498
Patented Jan. 25, 1966

3,231,498
LUBRICANTS CONTAINING HIGH MOLECULAR
WEIGHT SUCCINIC ACID COMPOUND
Louis de Vries, Richmond, Calif., assignor to Chevron
Research Company, a corporation of Delaware
No Drawing. Filed Mar. 28, 1963, Ser. No. 268,604
2 Claims. (Cl. 252—56)

This invention relates to a novel high molecular weight succinic acid compound. More particularly, the invention is concerned with a new hydrocarbon substituted succinic acid anhydride which is the maleic anhydride adduct of a high molecular weight unsaturated hydrocarbon polymer.

Succinic acid compounds, such as succinic acid and succinic anhydride and their hydrocarbon substituted analogs, are useful in the preparation of resins for coatings and laminants and the like. The high molecular weight succinic acid compounds have particular utility in hydrocarbon compositions as rust inhibitors, as thickening agents and as dispersants. They are also useful as chemical intermediates for the preparation of valuable oil-soluble compounds. For example, the succinic acid or anhydride groups may be reacted with polar compounds to provide superior new dispersants for paints, fuels, lubricants, and other compositions.

It has now been found that an improved new high molecular weight succinic acid compound is provided in the maleic adduct of the copolymer of (A) α-olefins of from about 2 to about 20 carbon atoms and (B) diolefins of from about 5 to about 20 carbon atoms in which the mole ratio of (A) to (B) is from about 1:1 to about 400:1, said unsaturated copolymer having a molecular weight of from about 10,000 to about 1,000,000, said copolymer having been prepared in the presence of a co-catalyst system comprising a reducing metal compound and a reducible metal compound.

The high molecular weight maleic adduct of this invention possesses valuable dispersing and thickening characteristics in liquid hydrocarbon compositions, such as fuels and lubricants. Due to the maleic group, the adduct is particularly suitable as a chemical intermediate. It reacts readily with polar compounds to provide a variety of superior new dispersants for paints, fuels, lubricants, and other compositions.

The high molecular weight maleic adduct of the invention using maleic anhydride in particular may also be described as a succinic anhydride substituted copolymer containing (A) monomer units having the general formula

—RCH—CH$_2$— in which R represents hydrogen or an aliphatic hydrocarbon radical of from about 1 to about 18 carbon atoms and mixtures thereof and (B) monomer units having the general formula

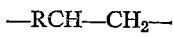

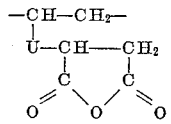

in which U represents an unsaturated aliphatic hydrocarbon radical of from about 2 to about 18 carbon atoms, the ratio of (A) to (B) being from 1:1 to about 400:1, said copolymer having a molecular weight as determined by standard light scattering methods of from about 10,000 to about 1,000,000.

The high molecular weight maleic adduct is generally characterized by a mixture of randomly distributed recurring component units having the schematic formula

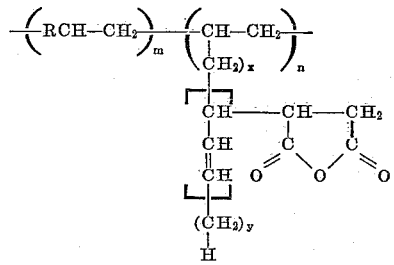

in which R is hydrogen or an aliphatic hydrocarbon radical of from about 1 to about 18 carbon atoms, $x$ is a number from 0 to 15 and $y$ is a number from 0 to 15, the total of $x$ and $y$ being from about 0 to about 18, the ratio of $m$ to $n$ being from about 1:1 to about 400:1 and preferably from about 10:1 to about 100:1.

In the above and following illustrative formulae the double bond in the bracketed portions may occur either between the succinic anhydride group and the polymer backbone or between the succinic anhydride group and the end of the pendant hydrocarbon side chain.

The maleic anhydride adducting agent as shown in the foregoing illustrations is preferably maleic anhydride. However, other known agents may be used, such as maleic acid, monochloromaleic acid, monochloromaleic anhydride, and the like.

The α-olefins in the copolymer maleic adduct of this invention contain at least 2 carbon atoms. Such olefins include ethylene, propylene, 1-butene, 1-pentene, 3-methyl-1-butene, 1-hexene, 1-heptene, 1-tetradecene, 1-octadecene. The diolefins or polyolefins have at least one terminal double bond and contain at least 5 carbon atoms, preferably at least 8. In addition to the terminal double bond the polyolefins contain at least one other double bond which may be located internally in the chain or may be located at the other terminal position. Such polyolefins include 1,5-hexadiene, 1,11-dodecadiene, 1,17-octadecadiene, 1,4-octadiene, 1,9-octadecadiene, 1,9,12-octadecatriene, etc. Also included are cyclic olefins such as dicyclopentadiene, etc.

In accordance with the present invention, the preferred maleic anhydride adducts are derived from copolymers of cracked wax olefin mixtures of (A) α-olefins of from about 6 to about 20 carbon atoms and (B) diolefins of from about 8 to about 20 carbon atoms. Such cracked wax olefin copolymers are described in detail in my copending application Serial No. 248,212, filed December 31, 1962. The maleic anhydride adducts of these copolymers have outstanding properties as lubricating oil additives and are useful in the preparation of still other superior additives for lubricants.

The cracked wax olefin mixtures are suitably prepared by thermal cracking of conventional refined paraffin waxes derived from typical waxy crude oils. Such waxes ordinarily consist of about 90% by weight of normal paraffins containing from about 16 to about 35 carbon atoms. The balance of the wax composition is made up of isoparaffins, naphthenes and small proportions of aromatic hydrocarbons. Thermal cracking which is preferred since it produces high proportions of α-olefins is conveniently carried out by charging the paraffin wax to a reaction zone, such as a hot tube, usually at temperatures of about 500° C. to about 600° C. A few seconds per pass is usually sufficient. Conversions of about 30 to 35% per pass are ordinarily obtained. Atmospheric conditions are preferred, but either pressure or vacuum may be employed if desirable. Diluents such as steam may also be used in the cracking procedure.

The products from the cracking reaction include hydrogen, methane and other hydrocarbons containing as high as 35 carbon atoms. They are effectively separated by conventional means, such as fractional distillation. The lower boiling portion of the products including hydrocarbons of five or fewer carbon atoms may be used as a fuel or in gasoline blending. The portion containig hydrocarbons of more than 20 carbon atoms, if desired, may be recycled for further cracking. The $C_6$ to $C_{20}$ portion may be further fractioned into particular hydrocarbons having carbon contents of $C_{6-7}$, $C_{7-9}$, $C_{9-11}$, $C_{11-15}$, $C_{15-20}$ and the like.

Other paraffin wax charge stocks, cracking conditions and separation procedures of the above-mentioned types arefound in descriptions in various publications. The descripiton in U.S. Patent No. 2,172,228 on "Process for the Manufacture of Olefins," is illustrative.

The analysis of a typical cracked wax olefin mixture indicates the following distribution of products:

| | Percent |
|---|---|
| Straight chain α-olefins | 89 |
| Straight chain α,ω-diolefins | 5 |
| Straight chain α-internal polyolefins | 1 |
| Branched-chain and naphthenic hydrocarbons | 3 |
| Conjugated internal diolefins, etc. | 2 |

In the preparation of the copolymers from which the maleic anhydride adducts of the present invention are derived, the ratio of α-monoolefins to polyolefins having a terminal double bond may range from as low as about 1:1 to as high as about 400:1. Preferred olefins are those having ratios from about 10:1 to about 100:1.

The copolymers are prepared by reacting the olefin mixtures in the presence of Ziegler-Natta type catalysts which have been found capable of providing satisfactory polymerization of α-olefins. Suitable catalysts and other general background for this type of polymerization reaction are described in a report entitled, "Stereospecific Catalysis," beginning at page 93 in the journal, "Chemical Engineering," for April 2, 1962 (McGraw-Hill Publishing Co., New York, N.Y.).

The catalytic polymerization reaction employed in the preparation of the polymers is an addition type polymerization. The exact mechanism is still not known, but it is generally thought that stereospecific catalysts provide controlled propagation of the polymer chain from the monomers. This controlled propagation in the case of the present α-olefin monomer mixture results in a linear hydrocarbon chain having randomly mixed alkyl and alkyenyl substituents on alternate carbon atoms as already discussed. For present purposes, the catalyst ordinarily involves the combination of a reducing metal compound with a reducible metal compound.

In the preparation of the copolymers from which the maleic anhydride adducts of the present invention are prepared, the preferred reducing compounds are aluminum compounds of the following formulae R′R″AlR‴, R′R″AlX, R′AlXX and $$\begin{matrix} X & X \\ R'AlAlR''' \\ R''X \end{matrix}$$

in which the hydrocarbon radicals, R′, R″ and R‴ which may be the same or different, contain from 1 to 10 carbon atoms each, and X's are halogens or mixtures thereof. Illustrative compounds are trimethyl aluminum, triphenyl aluminum, tribenzyl aluminum, phenyldiethyl aluminum, etc. The trialkyl aluminums having 2 to 6 carbon atoms in each alkyl group are most preferred from the standpoint of suitability and availability. The reducible metal compounds of the co-catalyst system used in the preparation of the copolymers is typically a metal of groups IV to VIII of the periodic system of elements, such as titanium, zirconium, vanadium, chromium, molybdenum, etc. Suitable compounds of such metals are the halides, the oxyhalides, the alcoholates, the carboxylic acid salts as illustrated by titanium tetrachloride, vanadium, oxychloride, chromium acetate, etc. The halide compounds are preferred, for example, titanium tetrachloride as well as the complex reaction product containing 3 moles of titanium trichloride to 1 mole of aluminum chloride.

The copolymerization is conveniently carried out at temperatures of from about 30° C. to about 150° C. at atmospheric pressure. The lower temperatures give copolymers of higher molecular weight. A hydrocarbon diluent, such as toluene, xylene, petroleum naphtha or mineral lubricating oil, is commonly employed. The diluent may also serve to some extent as a temperature control under reflux conditions. The reaction time is ordinarily from about 0.5 to 10 hours. When the polymerization reaction is completed to the desired extent, the reaction is stopped by quenching with an alcohol, such as isopropyl alcohol, thus deactivating the polymerization catalyst and incidentally precipitating the copolymer product from the inert hydrocarbon diluent. The copolymers as already mentioned are linear hydrocarbon chains having mixed alkyl and alkenyl substituents on alternate carbon atoms. They have molecular weights of at least about 10,000, preferably from about 50,000 to about 1,000,000 as determined by viscosity measurements and/or standard light scattering methods.

The maleic anhydride adducts of this invention are prepared from copolymers of the above types in a straightforward fashion by heating the copolymer and the maleic anhydride adducting agent together. The adduct is a new type of hydrocarbon succinic acid anhydride having recurrent succinic acid anhydride groups within a single molecule. Expressed on a weight basis, the maleic anhydride adducts preferably contain an average of at least 0.25% of the resulting succinic acid anhydride groups.

Using a copolymer of 1-dodecene and 1,8-dodecadiene by way of example, the adduction is conveniently illustrated by the following equation

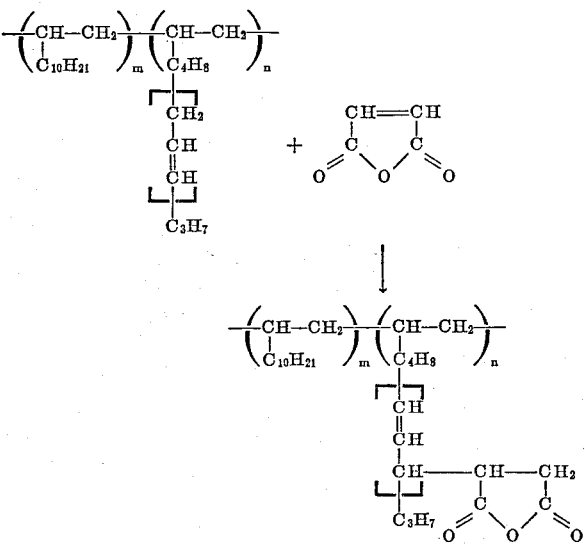

In the above equation, the schematic formulae as previously discussed are intended to show a polymer having $m$ and $n$ randomly distributed recurring monomer units in its backbone. The maleic anhydride adds to the unsaturated hydrocarbon radicals which are pendant from the polymer backbone to give succinic anhydride groups. As in the previous illustrations, the succinic anhydride portion within the brackets is shown as having a double bond one carbon atom removed from the carbon atom at which the succinic anhydride group is attached, which double bond may occur either between the succinic anhydride group and the polymer backbone or between the succinic anhydride group and the end of the pendant hydrocarbon radical.

In the adduction reaction, the temperatures are ordinarily between about 100° C. and 300° C., with temperatures between about 150° C. and 250° C. being preferred. The maleic anhydride is employed in a molar excess over the amount of (B) monomer present in the copolymer since unreacted maleic anhydride is readily removed by distillation and either recycled to the reaction or recovered for subsequent reuse. The copolymer and maleic anhydride are ordinarily heated together until the adduction is essentially complete as indicated by no further consumption of maleic anhydride. Usually reaction times of from as little as 4 hours up to 24 hours or more may be used to complete the reaction. If desired, the adduction may be carried out by other means, for example, by reaction of a chlorinated polymer containing about 1% by weight of chlorine with maleic anhydride.

Further illustrations of the preparation of maleic anhydride adducts of high molecular weight unsaturated hydrocarbon polymers are given in the following examples. Unless otherwise specified, the proportions are on a weight basis.

Example 1

In this example of a Ziegler type high molecular weight unsaturated polymer is synthesized from a typical mixture of cracked wax olefins of about 10 to 20 carbon atoms containing about 90% by weight straight chain α-olefins and about 6% by weight diolefins.

A co-catalyst mixture is prepared as the first step. 75 cc. of dry heptane is put into a 2-liter round bottom flask fitted with condenser and stirrer. From a polyethylene bag, against a nitrogen stream, there is added a vial containing 7.5 g. of titanium trichloride catalyst (Anderson Chemicals AA-Grade which contains some aluminum chloride). Through a pressure-equalized addition funnel there is then added another 75 cc. of heptane containing 9.35 g. of triisobutyl aluminum. During these operations, the temperature is ambient at 20° C.

As the next step, 600 cc. of dry xylene is added to the catalyst mixture at reflux temperature against a nitrogen stream. External heat is applied during this operation and when the temperature of the catalyst suspension reaches reflux, 200 g. of cracked wax olefins containing from 10 to 20 carbon atoms is added at about 110° C., again against effluent nitrogen. At this point the heating mantle is temporarily removed until the temperature increase due to the polymerization reaction subsides. After 45 minutes at maintained reflux, the mantle is lowered and when the temperature reaches 100° C., isopropyl alcohol is added until no further violent reaction occurs. Subsequent addition of a large amount of methanol now precipitates the polymer. The supernatant is discarded, and the polymer is washed with methanol and then with acetone. After three subsequent precipitations from benzene solution with acetone, the polymer is dissolved in benzene. Evaporation of an aliquot proves the yield to be 89%.

Example 2

The adduction of maleic anhydride to cracked wax olefin polymer is illustrated by this example.

60 g. of cracked wax olefin copolymer as prepared above is heated for about 24 hours in a mixture of 120 g. of cetane, 25 g. of maleic anhydride and 2 g. of bis(dibutylhydroxyphenyl)methane under a nitrogen atmosphere. The temperature is maintained at about 210° C. The adduct is then precipitated with dry acetone and redissolved in benzene. This operation is repeated three times. The last time the benzene solution is filtered over activated clay. The filtered solution is light amber in color. The maleic anhydride content is measured by the intensity of the 1760 cm.$^{-1}$ band in the infrared spectrograph. The equivalent weight based on succinic anhydride is found to be approximately 6000. The molecular weight of the adduct is about 300,000.

Example 3

In this example, a maleic anhydride adduct is prepared from the copolymer of a synthetic mixture of 1-dodecene and 1,9-octadecadiene in 15:1 molar ratio having a molecular weight of about 300,000.

25 g. of the copolymer in 60 g. of cetane is heated for about 24 hours at a temperature of about 215° C. with 10 g. of maleic anhydride and 0.5 g. of bis(dibutylhydroxyphenyl)methane. The polymer is precipitated with acetone and redissolved in benzene four times. The infrared absorbance for succinic anhydride groups at 1760 cm.$^{-1}$ indicates an anhydride equivalent of about 4100 which corresponds to an approximate ratio of pendant alkyl groups to pendant alkenyl succinic acid anhydride of 22:1. The "anhydride equivalent" is the number of grams of polymer which combine with 98 g. of maleic anhydride.

The adduct was tested for thickening properties in mineral lubricating oil. 2.8% by weight of the adduct was dissolved in 150 Neutral oil which is a California paraffin base oil having a viscosity of 150 SSU at 100° F. This base oil ordinarily has a viscosity index of 85. When the adduct was dissolved in the 150 Neutral oil, the viscosity index was raised to 137.

Example 4

Using the above procedures, a maleic anhydride adduct is prepared of a copolymer of synthetic mixture of 1-dodecene and 1,9-octadecadiene. The copolymer has a molecular weight of about 300,000 and contains the monomers in a ratio of about 50:1. The maleic anhydride adduct has an anhydride equivalent of 10,900, corresponding to a succinic acid anhydride ratio of 63:1. A 2.8% by weight solution of the adduct in 150 Neutral oil gives a viscosity index of 137.

Example 5

In this example, the copolymer used in preparing the adduct has an actual molar ratio of 1-dodecene to 1,9-octadecadiene of 90:1. It has a molecular weight of about 300,000. The maleic anhydride adduct derived from this polymer has an anhydride equivalent of 21,000, corresponding to a 123:1 succinic acid anhydride ratio. A 2.8% by weight solution of the adduct in 150 Neutral oil gives a viscosity index of 137.

Example 6

The copolymer in this example is prepared from cracked wax olefins of from about 11 to 15 carbon atoms containing about 89% α-olefins and about 6% diolefins containing a terminal double bond. The copolymer has a molecular weight of about 300,000. The maleic anhydride adduct of the copolymer is found to have an anhydride equivalent of about 6800. A 2.8% solution in 150 Neutral oil gives a viscosity index of 138.

Example 7

60 g. of cracked wax olefin polymer, as in Example 6, is dissolved in 150 g. of cetane and heated for 18 hours at 430° F. in the presence of 0.5 g. of bis(dibutylhydroxyphenyl)methane and 15 g. of chloromaleic anhydride. The reaction product is cooled under nitrogen, then precipitated four times with dry acetone, then dissolved in benzene. The reaction products show a very strong absorption band at 1760 cm.$^{-1}$ in the infrared spectroscope (this band corresponds to an anhydride group). The percent oxygen (by neutron oxidation analysis) is 1.91%, indicating an anhydride equivalent of 2510.

The adducts of this invention are oil soluble. This is intended to mean that they are soluble in conventional mineral lubricating oils and other oil compositions, such as fuels, in a concentration of adduct of at least about 0.1% by weight based on the total composition.

In the lubricating oil compositions of this invention, the adduct is used with lubricating oil base in amounts sufficient to raise the viscosity index of the base lubricating oil. Ordinarily, amounts of adduct of from about 0.1% to about 15% by weight are satisfactory for these purposes. In view of the excellent solubility characteristics of the adducts, a further feature of the invention lies in the preparation of lubricating oil concentrates containing higher percentages of adducts up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di(2-ethylhexyl)sebacate, tricresylphosphate and silicate esters, such as tetra(2-ethylhexyl)orthosilicate and hexa(2-ethylbutoxy)disiloxane. For present purposes the mineral lubricating oils are preferred, since they show the greatest viscosity and stability improvement.

Lubricant compositions within the scope of the present invention may also contain still other additives of conventional types, such as pour point depressants, oiliness and extreme pressure agents, anti-oxidants, blooming agents and the like.

Illustrative lubricant compositions of the aforementioned types containing additives other than the polymeric additive may include, for example, from about 0.1 to about 10% by weight of alkaline earth metal higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and P$_2$S$_5$, the reaction product of polybutene and P$_2$S$_5$, and the bivalent metal dihydrocarbon dithiophosphates, zinc butyl amyl dithiophosphate and zinc di(tetradecylphenyl)dithiophosphate. Metal salt detergents in amounts from about 0.1 to 10% which may also be used are the calcium petroleum sulfonates of the oil-soluble mahogany type and the calcium naphthenates.

As already mentioned, the high molecular weight maleic anhydride adduct of this invention is useful in hydrocarbon fuels. In general, hydrocarbon base fuels customarily contain components such as cracked stocks which have a tendency to be unstable and thus form gum and deposits which clog filters and lines in fuel systems. Furnace oils, kerosenes, diesel fuel oils and jet fuels in particular contain substantial amounts of cracked gas oil stocks and form objectionable deposits during normal storage and operating conditions.

The greatest improvement in reduction of deposit characteristics of hydrocarbon distillate fuels is usually obtained by the incorporation of the maleic anhydride adduct in distillate fuels composed predominantly of hydrocarbons boiling above about 300° F. Such fuels commonly utilize substantial amounts of cracked stocks and cycle stocks boiling in the range of about 350–750° F. For present purposes, the preferred base fuels are those boiling predominantly within the range of from about 300 to about 750° F. Although the higher boiling base fuels are preferred as deriving the greatest benefit in reduction of deposit-forming characteristics, hydrocarbon base fuels in the gasoline boiling range of from about 50 to about 435° F. are also contemplated, since such fuels are known to form objectionable gummy deposits in the fuel systems of spark ignition engines.

The high molecular weight maleic anhydride adducts of this invention when combined in minor proportions with such hydrocarbon base fuels are found to effectively prevent the formation of undesirable deposits. Usually, small proportions of from about 0.0005 to 1.0% by weight based on the hydrocarbon fuel are sufficient for this purpose. In addition to the maleic anhydride adduct, other conventional fuel additives may be used. Such additives include anti-icing agents of the oil-soluble alkylphenyl polyglycol ether, methyl cellosolve and glycerine types mentioned in U.S. Patent 2,786,745. Rust inhibiting agents such as dinonyl naphthalene ammonium sulfonates may also be used.

I claim:

1. A lubricating oil composition comprising a major proportion of mineral lubricating oil and a minor proportion sufficient to improve the viscosity index of the oil of an oil-soluble copolymer consisting of a mixture of randomly distributed recurring monomer units having the formula

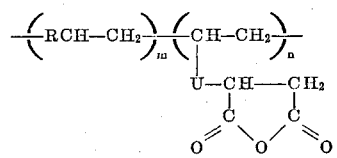

in which U represents an unsaturated aliphatic hydrocarbon radical of from about 6 to about 18 carbon atoms and R is a member of the group consisting of hydrogen and an aliphatic hydrocarbon radical of from about 4 to about 18 carbon atoms, the ratio of $m$ to $n$ being about 10:1 to about 100:1, said copolymer having a molecular weight of from about 50,000 to about 1,000,000.

2. A lubricating oil composition in accordance with claim 1 wherein the copolymer portion having the formula

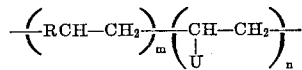

is derived from cracked wax olefin mixtures of (A) α-olefinic hydrocarbons of from about 6 to about 20 carbon atoms each and (B) diolefinic hydrocarbons of from about 8 to about 20 carbon atoms each.

References Cited by the Examiner

UNITED STATES PATENTS

| | | | |
|---|---|---|---|
| 2,378,629 | 6/1945 | Hanford | 260—78 |
| 2,634,256 | 4/1953 | Sparks et al. | 260—78.4 |
| 2,977,334 | 3/1961 | Zopf | 252—56 X |
| 3,005,800 | 10/1961 | Powers et al. | 260—78.4 |

FOREIGN PATENTS 565,390   10/1958   Canada.

OTHER REFERENCES

Noller: Chemistry of Carbon Compounds (1951), W. B. Saunders Co., Philadelphia, Pa.

DANIEL E. WYMAN, *Primary Examiner.*